United States Patent
Klacking

(10) Patent No.: US 11,492,268 B2
(45) Date of Patent: Nov. 8, 2022

(54) WATER FILTRATION AND RECYCLING SYSTEM

(71) Applicant: SlurryMonster, LLC, Livonia, MI (US)

(72) Inventor: Ryan Klacking, Canton, MI (US)

(73) Assignee: SLURRYMONSTER, LLC, Livonia, MI (US)

( * ) Notice: Subject to any disclaimer, the term of this patent is extended or adjusted under 35 U.S.C. 154(b) by 154 days.

(21) Appl. No.: 16/932,583

(22) Filed: Jul. 17, 2020

(65) Prior Publication Data
US 2021/0017043 A1 Jan. 21, 2021

Related U.S. Application Data

(60) Provisional application No. 62/875,234, filed on Jul. 17, 2019, provisional application No. 62/878,588, filed on Jul. 25, 2019.

(51) Int. Cl.
*B01D 36/00* (2006.01)
*C02F 1/00* (2006.01)
(Continued)

(52) U.S. Cl.
CPC .............. *C02F 1/004* (2013.01); *B01D 29/56* (2013.01); *B01D 36/00* (2013.01); *B01D 37/045* (2013.01); *C02F 1/006* (2013.01)

(58) Field of Classification Search
CPC ...... B01D 29/56; B01D 29/605; B01D 36/00; B01D 37/045; C02F 1/004; C02F 1/006
(Continued)

(56) References Cited

U.S. PATENT DOCUMENTS 4,001,115 A * 1/1977 Arvanitakis ........... B01D 37/04
210/196
5,965,015 A * 10/1999 Ronan .................. B01D 17/045
210/167.31
(Continued)

FOREIGN PATENT DOCUMENTS

CN 109224577 1/2019
WO 2013063107 5/2013

OTHER PUBLICATIONS

The International Search Report and Written Opinion for International Patent Application No. PCT/US2020/042650 dated Oct. 15, 2020.
(Continued)

*Primary Examiner* — Christopher Upton
(74) *Attorney, Agent, or Firm* — Carlson, Gaskey & Olds, P.C.

(57) ABSTRACT

A water filtration and recycling system includes an external machine to collect solid particles and water, a first filter to filter the solid particles from the water to form primary filtered water, a second filter to filter the solid particles from the primary filtered water to form secondary filtered water, and a water tank to store the secondary filtered water, wherein secondary filtered water recycles to the external machine in a closed loop. The water filtration and recycling system includes a recycling machine including a clean tank to hold clean water that cycles through the water filtration and recycling system, a dirty tank to hold dirty water that cycles through the water filtration and recycling system, a dirty water in manifold to direct the water into the dirty manifold, a dirty water out manifold to direct the water out of the dirty manifold, a clean water in manifold to direct the water into the clean manifold, and a clean water out manifold to direct the water out of the clean manifold.

20 Claims, 4 Drawing Sheets

(51) Int. Cl.
*B01D 29/56* (2006.01)
*B01D 37/04* (2006.01)

(58) Field of Classification Search
USPC .................. 210/86, 104, 167.31, 196, 335
See application file for complete search history.

(56) References Cited

U.S. PATENT DOCUMENTS

| | | | |
|---|---|---|---|
| 7,494,592 B2* | 2/2009 | Deskins | C02F 1/004 |
| | | | 210/694 |
| 8,506,819 B2* | 8/2013 | Major | B23Q 11/1069 |
| | | | 210/167.31 |
| 2003/0003851 A1 | 1/2003 | Cann et al. | |
| 2004/0168992 A1* | 9/2004 | Ben-Amotz | E03B 1/042 |
| | | | 210/167.31 |
| 2005/0045565 A1* | 3/2005 | Perry | C02F 1/004 |
| | | | 210/104 |
| 2013/0284679 A1* | 10/2013 | Bailin | C02F 1/004 |
| | | | 210/767 |
| 2014/0021112 A1* | 1/2014 | Boodaghians | C02F 1/008 |
| | | | 210/167.31 |

OTHER PUBLICATIONS

The International Preliminary Report on Patentability for International Patent Application No. PCT/US2020/042650 dated Jan. 18, 2022.

* cited by examiner

WATER FILTRATION AND RECYCLING SYSTEM

REFERENCE TO RELATED APPLICATIONS

This application claims the benefit of U.S. Provisional Application No. 62/875,234 filed Jul. 17, 2019 and U.S. Provisional Application No. 62/878,588 filed Jul. 25, 2019, the disclosures of which are incorporated entirely by reference.

BACKGROUND

Water and concrete particles mix form a slurry. Air pressure can be used to move slurry to separate water from the concrete particles.

SUMMARY

Embodiments of a water filtration and recycling system are disclosed herein. The water filtration and recycling system includes an external machine to collect solid particles and water, a first filter to filter the solid particles from the water to form primary filtered water, a second filter to filter the solid particles from the primary filtered water to form secondary filtered water, and a water tank to store the secondary filtered water, wherein secondary filtered water recycles to the external machine in a closed loop. The water filtration and recycling system includes a recycling machine including a clean tank to hold clean water that cycles through the water filtration and recycling system, a dirty tank to hold dirty water that cycles through the water filtration and recycling system, a dirty water in manifold to direct the water into the dirty manifold, a dirty water out manifold to direct the water out of the dirty manifold, a clean water in manifold to direct the water into the clean manifold, and a clean water out manifold to direct the water out of the clean manifold.

In an embodiment, the system includes a vacuum to generate pressure or suction and a positive negative pressure switch to direct the pressure or the suction to the clean tank or the dirty tank.

In an embodiment, the external machine includes a suction tool to extract the solid particles and the water into an external tank of the external machine.

In an embodiment, the system includes the external machine that includes an external tank, a first valve that is opened to offload the water from the external tank and into the dirty tank, the first valve is closed, a second valve that is opened to offload the water from the dirty tank and into the first filter, and the second valve closes when a first switch in the first filter detects a high water level in the first filter.

In an embodiment, the system includes a first valve that is opened to load the clean tank with clean water from the water tank, and when a high switch of the clean tank detects a high water level in the clean tank, the first valve is closed and a second valve is opened to offload the clean water from the clean tank and into the external machine.

In an embodiment, the system includes a first valve that opens to offload dirty water from the first filter to the dirty tank until a high switch in the dirty tank detects a high level of the dirty water, the first valve closes, a second valve that opens to offload the dirty water from the dirty tank to the second filter, the second valve closes when a switch in the second filter detects a high level of water in the second filter, a third valve that opens to offload the clean water from the second filter to the clean tank until a high switch of the clean tank detects a high water level in the clean tank, the third valve closes, and a fourth valve that opens to offload the clean water from the clean tank to the water tank until a high switch in the clean tank detects a high level of the clean water.

In an embodiment, the system includes a first valve that opens to offload the dirty water from a first filter to the dirty tank until a high switch of the dirty tank detects a high water level in the dirty tank, the first valve closes, a second valve that opens to allow the dirty water from the dirty tank to offload to the second filter, the second valve closes when the switch in the second filter detects a high level of water, a third valve is that opens to allow the clean water to offload from the second filter to the clean tank until a high switch in the clean tank detects a high level of water, the third valve closes, a fourth valve that opens to offload the clean water from the clean tank to the water tank until the switch of the water tank activates a high level of water, and the fourth valve close.

In an embodiment, the system includes a switch that detects that a level of water in a waste tank is high, all valves are closed, a first valve is opened to offload water from the waste tank to the dirty tank, the first valve closes when a switch of the waste tank detects a high water level in the waste tank, and an alarm sounds.

In an embodiment, the system includes a first valve that is opened to allow the clean water from the water tank to offload to the clean tank until the high switch in the clean tank detects a high level of water, the first valve closes, and a second valve that is opened to allow a clean water pump to pump clean water from the clean water tank to be used as rinse water.

In an embodiment, the system includes a wet line, wherein the clean water is offloaded into the clean tank from the water tank until a high switch of the clean tank detects a high level of water in the clean tank, and a clean water pump is activated to pump clean water to the wet line to mix with dirt and flow into the dirty tank.

In an embodiment, the system includes a vacuum pump offloads dirty water from the wet line to load the dirty tank until the high switch of the dirty tank detects a high level of water, and a valve that is opened to offload dirty water in the dirty tank to the first filter until a low switch in the clean tank detects a low level of water in the clean tank.

Embodiments of a method water filtration and recycling system are disclosed herein. The method includes collecting solid particles and water, filtering the solid particles from the water to form primary filtered water, filtering the solid particles from the primarily filtered water to form secondary filtered water, storing the secondary filtered water and recycling the secondary filtered water to use in the step of collecting solid particles and water.

DETAILED DESCRIPTION

Figure 1:
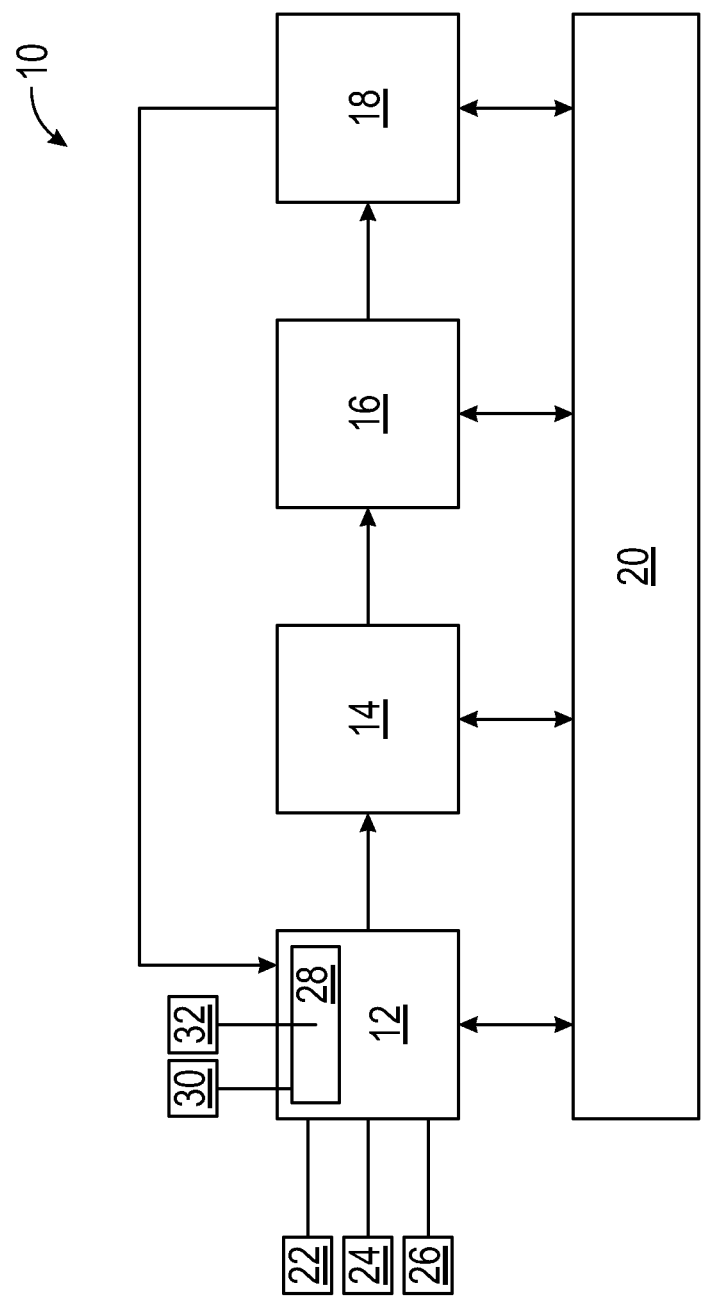
FIG. 1 illustrates a schematic view of a water filtration and recycling system.

FIG. 1 illustrates a water filtration and recycling system 10. The system 10 includes an external machine 12, a first filter 14, a second filter 16, and a water tank 18. The system 10 provides a closed loop operation that filters and recycles water. The system 10 also includes a recycling machine 20 that is in fluid communication with each of the components (the external machine 12, the first filter 14, the second filter 16, and the water tank 18) and controls a flow of clean water and dirty water through the system 10 to allow different operations to be performed.

The external machine 12 can include a device for grinding and cutting 22 concrete to produce a slurry that includes a mixture of concrete particles and water. Water is added to the concrete through a hose 24. A suction tool 26 extracts the slurry from a floor or wall into an external tank 28 of the external machine 12. In another example, a separate suction machine extracts the slurry into the external tank 12. A chemical 30 is injected into the slurry in the external tank 28 and mixed with an external mixer 32. The slurry will autoflocculate.

The slurry from the external machine 12 is first directed to the first filter 14 for processing. The first filter 14 is a first stage of filtration and the primary filter. The first filter 14 filters water from the slurry and includes a filter media, mesh, and a bin (not shown). In one example, the bin can be a dumpster. The water in the slurry passes through the first filter 14, and the slurry particles are collected in the bin. The slurry particles collected in the bin of the first filter 14 can be disposed of, the bin can be removed or replaced, or the entire first filter 14 including the bin can be replaced when needed. Water extracted from the first filter 14 is discharged to the second filter 16.

The water from the first filter 14 is then directed to the second filter 16 for processing. The second filter 16 is the second stage of filtration and the second filter. The second filter 16 filters the water that exits the first filter 14 and includes a filter media, mesh, and a bin (not shown). In one example, the bin can be a dumpster. The water in the slurry passes through the second filter 16, and any remaining slurry particles are collected in the bin. The slurry particles collected in the bin of the second filter 16 can be disposed of, the bin can be removed or replaced, or the entire second filter 16 including the bin can be replaced when needed. Water extracted from the second filter 16 is discharged to the water tank 18 for storage.

The water originally used in the external machine 12 is filtered by the first filter 14 and the second filter 16 and stored in the water tank 18. When water is needed to be used with the external machine 12, the water in the water tank 18 can be recycled back to the external machine 12 for reuse. That is, the water is cycled in a closed loop. The water in the slurry does not need to be disposed of, and additional water does not need to be transferred to the external machine 12.

The external machine 12, the first filter 14, the second filter 16, and the water tank 18 are each connected to a large bin or dumpster that stores the fluid associated with each component.

Figure 2:
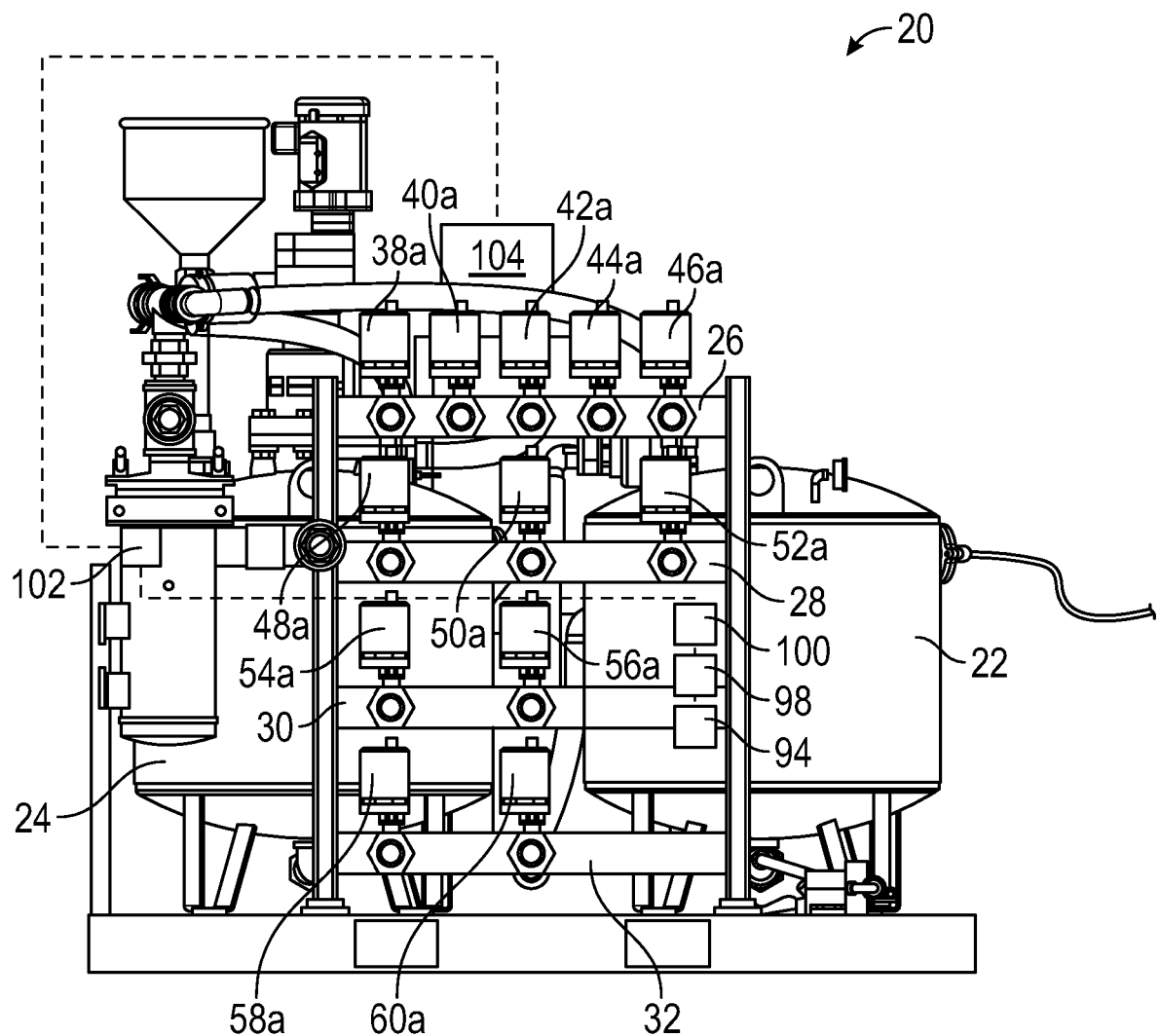
FIG. 2 illustrates a schematic view of a recycling machine of the system including a clean tank, a dirty tank system, and associated manifolds.

FIG. 2 illustrates the recycling machine 20 of the system 10 including a clean tank 22, a dirty tank 24, and associated manifolds 26, 28, 30, and 32 that control a flow of dirty water and clean water between the clean tank 22, the dirty tank 24, and the components of the system 10 (the external machine 12, the first filter 14, the second filter 16, the water tank 18, described in more detail below) to define the closed loop system 10.

A dirty water in manifold 26 includes external cam actuators 38a, 40a, 42a, 44a, and 46a that allow dirty water to enter through a top of the dirty tank 24 through a hose (not shown), and a dirty water out manifold 28 includes external cam actuators 48a, 50a, and 52a that allow dirty water to exit through a bottom of the dirty tank 24 through a hose (not shown). A clean water in manifold 30 includes external cam actuators 54a and 56a that allow clean water to enter through a top of the clean tank 22 through a hose (not shown), and a clean water out manifold 32 includes external cam actuators 58a and 60a that allow clean water to exit through a bottom of the clean tank 22 through a hose (not shown).

One end of a hose 38c, 40c, 42c, 44c, 46c, 48c, 50c, 52c, 54c, 56c, 58c, and 60c is connected to one of the external cam actuators 38a, 40a, 42a, 44a, 46a, 48a, 50a, 52a, 54a, 56a, 58a, and 60a, respectively, and an opposing end of a hose is connected to one of the components of the system 10. A valve 38b, 40b, 42b, 44b, 46b, 48b, 50b, 52b, 54b, 56b, 58b, 60b, 62b is opened and closed as described below to allow fluid to flow through a respective hose 38c, 40c, 42c, 44c, 46c, 48c, 50c, 52c, 54c, 56c, 58c, 60c, 62c, and 64c to perform different operations, as explained below.

Only one operation can be performed at a time. When an operation begins, all the actuators 38a, 40a, 42a, 44a, 46a, 48a, 50a, 52a, 54a, 56a, 58a, and 60a are closed. When an operation is begun by pressing a button on the control panel (not shown), a controller (not shown) sends a signal to a vacuum pump 94 to provide pressure or suction. Based on the signal and the operation selected, a positive/negative pressure switch 98 will either provide positive pressure to provide pushing or negative pressure to provide suction. The pressure from the positive/negative pressure switch 98 is then directed to an actuator 100, which diverts the pressure to a pressure relief line 102 that provides a safety feature.

The pressure is then directed to another actuator 104. Based on the operation, the another actuator 104 directs the pressure to a top of the clean tank 22 or the dirty tank 24 based on the operation selected. If a positive pressure to provide pushing is applied to the top of the clean tank 22 or the dirty tank 24, fluid will flow through a conduit at a bottom of the clean tank 22 or the dirty tank 24 to perform the operation. If a negative pressure to provide suction is applied to the top of the clean tank 22 or the dirty tank 24, the fluid will flow through a conduit at a top of the clean tank 22 or the dirty tank 24 to perform the operation. When the operation is over, all the actuators 38a, 40a, 42a, 44a, 46a, 48a, 50a, 52a, Ma, 56a, 58a, and 60a are closed.

| Valve | Hose | Fluid | Actuator/Manifold | From | To |
|---|---|---|---|---|---|
| Valve 38b | Hose 38c | Dirty | Actuator 38a of dirty water in manifold 26 | External machine 12 | Dirty tank 24 |
| Valve 58b | Hose 58c | Clean | Actuator 58a of clean water out manifold 32 | Clean tank 22 | External machine 12 |
| Valve 62b | Hose 62c | Clean | | Clean tank 22 | Clean water pump |
| Valve 40b | Hose 40c | Dirty | Actuator 40a of dirty water in manifold 26 | First filter 14 | Dirty tank 24 |
| Valve 42b | Hose 42b | Dirty | Actuator 42a of dirty water in manifold 26 | First filter 14 | Dirty tank 24 |
| Valve 48b | Hose 48c | Dirty | Actuator 48a of dirty water out manifold 28 | Dirty tank 24 | First filter 14 |
| Valve 54b | Hose 54c | Clean | Actuator 54a of clean water in manifold 30 | Second filter 16 | Clean tank 22 |
| Valve 50b | Hose 50c | Dirty | Actuator 50a of dirty water out manifold 28 | Dirty tank 24 | Second filter 16 |
| Valve 56b | Hose 56c | Clean | Actuator 56a of clean water in manifold 30 | Water tank 18 | Clean tank 22 |
| Valve 60b | Hose 60c | Clean | Actuator 60a of clean water out manifold 32 | Clean tank 22 | Water tank 18 |
| Valve 44b | Hose 44c | Dirty | Actuator 44a of dirty water in manifold 26 | Waste tank 34 | Dirty tank 24 |
| Valve 52b | Hose 52c | Dirty | Actuator 52a of dirty water out manifold 28 | Dirty tank 24 | Waste tank 34 |

-continued

| Valve | Hose | Fluid | Actuator/Manifold | From | To |
|---|---|---|---|---|---|
| Valve 46b | Hose 46c | Dirty | Actuator 46a of dirty water in manifold 26 | Wet line 36 | Dirty tank 24 |
| Valve 64b | Hose 64c | Clean | | Clean tank 22 | Wet line 36 |

Figure 3:
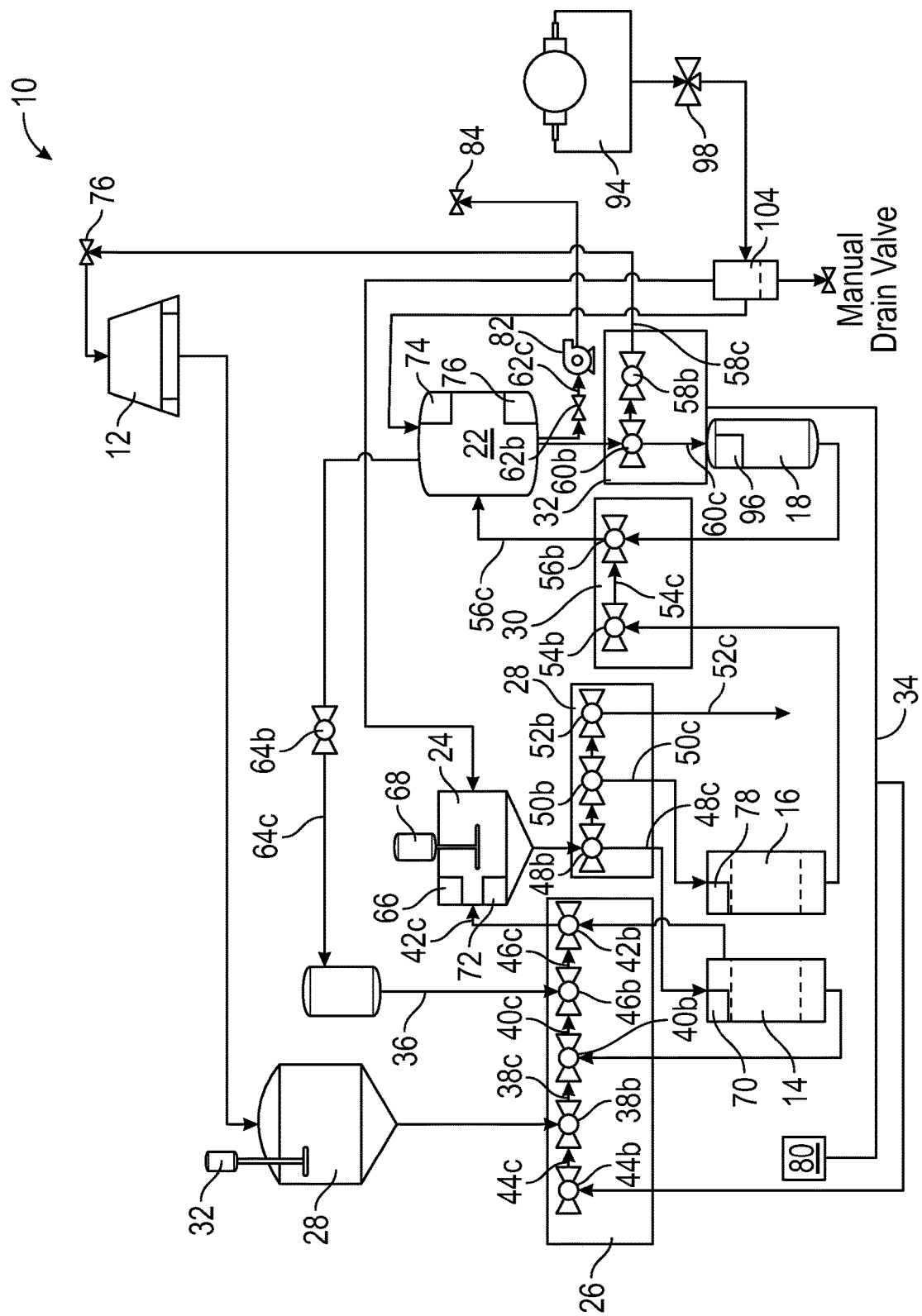
FIG. 3 illustrates a schematic view of the water filtration and recycling system of FIG. 1 including the machine of FIG. 2.

There are several operations that can be performed by the system 10 by opening and closing the valves 38b, 40b, 42b, 44b, 46b, 48b, 50b, 52b, 54b, 56b, 58b, 60b, 62b, and 64b to control a flow of a fluid through the hoses 38c, 40c, 42c, 44c, 46c, 48c, 50c, 52c, 54c, 56c, 58c, 60c, 62c, and 64c to control a flow of clean water and dirty water between the clean tank 22, the dirty tank 24, and the components of the system 10. The operations can be initiated by pressing a button on a control panel (not shown). When the button is pressed, the controller sends a signal to the recycling machine 20 to open and close the valve 38b, 40b, 42b, 44b, 46b, 48b, 50b, 52b, 54b, 56b, 58b, 60b, 62b, and 64b based on the operation, as well as to the vacuum pump 94 and the positive negative pressure switch 98. The operations are described below, and the features are shown in FIG. 3.

Empty External Tank 28 with Autofeed Off

One operation empties an external tank 28 of the external machine 12. An operator presses an external spin button (not shown) to active the operation. The external mixer 32 is activated to mix the dirty water in the external tank 28. After a delay, the controller sends a signal to open the valve 38b to offload dirty water from the external tank 28, through the hose 38c, and into the dirty tank 24. When a high switch 66 in the dirty tank 24 is activated, a signal is sent to the controller to indicate that there is a high volume of dirty water in the dirty tank 24. A signal is sent from the controller to deactivate the external mixer 32. In another example, the external mixer 32 is deactivated after a fixed amount of time.

A mixer 68 in the dirty tank 24 is then activated for approximately 60 seconds. The controller sends a signal to close the valve 38b and then open the valve 48b, offloading the dirty water from the dirty tank 24 to the first filter 14 through a hose 48c. After a fixed amount of time, the mixer 68 in the dirty tank 24 is deactivated, and the dirty water continues to offload to the first filter 14 for a fixed amount of time.

The operation ends when the operator presses an off button (not shown) to close the valve 48b or switches to another mode of operation mode. The operation also ends when a switch 70 in the first filter 14 is activated to indicate that the level of the water in the first filter 14 is high.

Empty External Tank 28 with Autofeed on

Another operation also empties the external tank 28 of the external machine 12. An operator presses an external spin button (not shown) to active the operation. The external mixer 32 is activated to mix the dirty water in the external tank 28, and an upper actuator 104 opens. After a delay, the controller sends a signal to open the valve 38b to offload dirty water from the external tank 28, through the hose 38c, and into the dirty tank 24. When a high switch 66 in the dirty tank 24 is activated, a signal is sent to the controller to indicate that there is a high volume of dirty water in the dirty tank 24. The controller sends another signal to deactivate the external mixer 32. In another example, the external mixer 32 is deactivated after a fixed amount of time.

The vacuum pump 94 connected to the dirty tank 24 is turned off, and a lower actuator 100 is opened. After a fixed amount of time, the lower actuator is closed, and the vacuum pump 94 is then started. The mixer 68 in the dirty tank 24 is then activated for approximately 60 seconds, and the vacuum pump 94 is started. The controller sends a signal to close the valve 38b and then open the valve 48b, offloading the dirty water from the dirty tank 24 to the first filter 14 through a hose 48c. After a fixed amount of time, the mixer 68 in the dirty tank 24 is deactivated, and the dirty water continues to offload to the first filter 14 for a fixed amount of time.

The operation ends when the operator presses an off button (not shown) to close the valve 48b or switches to another mode of operation mode. The operation also ends when a switch 70 in the first filter 14 is activated to indicate that the level of the dirty water in the first filter 14 is high.

Fill External Machine 12

In another operation, a button is pressed to fill the external machine 12 with clean water. The controller sends a signal to open the valve 56b on the hose 56c to load the clean tank 22 with water from the water tank 18. When a high switch 74 of the clean tank 22 is activated to indicate that there is a high volume of water in the clean tank 22, or after a predetermined amount of time, the controller sends a signal to close the valve 56b. The controller sends a signal to open the valve 58b for a predetermined amount of time to offload clean water from the clean tank 22 and into the external machine 12 through the hose 58c.

When a low switch 76 of the clean tank 22 is activated, a signal is sent to the controller to indicate that an amount of clean water in the clean tank 22 is low. The controller sends a signal to close the valve 58b to stop water from loading into the external machine 12. The controller sends a signal to open the valve 56b, allowing clean water to again flow through the hose 56c and offload from the water tank 18 to load the clean tank 22 with clean water. Once the high switch 74 of the clean tank 22 is activated, a signal is sent to the controller that indicates that an amount of clean water in the clean tank 22 is high. The controller can then send a signal to the valve 58b to allow water to continue to load into the external machine 12.

The cycle automatically switches between loading and offloading until the operator presses a button (not shown) to end the operation or the operator switches to another mode of operation. A manual gate valve 76 is located after the valve 58b to allow the operator to shut off a flow of clean water to the external machine 12 when full.

Additionally, if the operation is over and the low switch 76 of the clean tank 22 did not send a signal to the controller indicating that the amount of water in the clean tank 22 is low, the controller sends a signal to open the valve 60b to offload water through the hose 60c from the clean tank 22 to load the water tank 18.

Process Waste Water

There are two operations to process waste water. There are 2 buttons (not shown) that each activate one of two operating modes when pressed. Only one button can be activated at a time during manual operation.

When a first button (not shown) is pressed, a filter operation occurs. The controller sends a signal to open the valve 40b to allow dirty water to offload from the first filter 14 to the dirty tank 24 through the hose 40c until the high switch 66 of the dirty tank 24 is activated, sending a signal to the controller indicating that the dirty tank 24 is full of dirty water. In another example, the valve 40b opens for a predetermined amount of time.

The controller sends a signal to close the valve 40b, and then opens the valve 50b to offload dirty water from the dirty tank 24 through the hose 50c to the second filter 16. When the switch 78 in the second filter 16 is activated to indicate that the second filter 16 is full of water, the operation is automatically stopped. If the switch 78 of the second filter 16 is not activated (and therefore the second filter 16 is not full of water), the controller sends a signal to open the valve 54*b* to offload clean water from the second filter 16 to the clean tank 22 until the high switch 74 of the clean tank 22 is activated and sends a signal to the controller to indicate a high volume of water in the clean tank 22. The controller then sends a signal to close the valve 54*b*. In another example, the valve 54*b* is closed after a predetermined amount of time. The controller sends a signal to open the valve 60*b* to allow the clean water from the clean tank 22 to offload to the water tank 18. When the switch 96 of the water tank 18 activates to indicate that the water tank 18 is full, the controller sends a signal to close the valve 60*b*, and the operation automatically stops.

In another operating mode, when a second button (not shown) is pressed, a skimming operation is performed. This operation can also occur automatically. The controller sends a signal to open the valve 42*b* to allow dirty water from the first filter 14 to offload through the hose 42*b* to the dirty tank 24 until the high switch 66 of the dirty tank 24 activates and sends a signal to the controller to indicate that the dirty tank 24 is full. The controller then sends a signal to close the valve 42*b* and open valve 50*b* for a predetermined amount of time to allow dirty water from the dirty tank 24 to offload through the hose 50*c* to the second filter 16. When the switch 78 in the second filter 16 activates to indicate that the second filter 16 is full of dirty water, the controller sends a signal to close the valve 50*b*, and the operation automatically stops.

Fill Water Tank 18

In another operation, a button (not shown) is pressed to fill the water tank 18 with clean water. The controller sends a signal to open the valve 54*b* to offload clean water through the hose 54*c* from the second filter 16 to the clean tank 22. When the high switch 74 in the clean tank 22 is activated to indicate a high volume of water, a signal is sent to the controller, and the controller sends a signal to close the valve 54*b*. In another example, the valve 54*b* is closed after a predetermined amount of time.

The controller sends a signal to open the valve 60*b* for a fixed amount of time to offload water from the clean tank 22 to the water tank 18 through the hose 60*c*. When the switch 96 of the water tank 18 is activated to indicate that the water tank 18 is filled, a signal is sent to the controller. The controller sends a signal to close the valve 60*b*, and the operation automatically stops. The operation also stops when shut down by an operator or switched to a different operation.

Waste Tank/Auxiliary

There are two operations for a waste tank 34 and auxiliary operation. There are 2 buttons (not shown) that each activate one of two operating modes. Only one button can be activated at a time during manual operation.

A waste tank 34 provides protection in the event of a breach of the first filter 14, the second filter 16, and the water tank 18. The waste tank 34 can be a berm or a liner that would contain fluid in the event of a breach to prevent spillage.

When a button (not shown) is pressed by an operator, the waste tank 34 operation begins. The operation can also be performed automatically. When a switch 80 of the waste tank 34 is activated indicating that the waste tank 34 is full of water, a signal is sent to the controller, and the controller sends a signal to close all valves. The controller sends a signal to open the valve 44*b* to allow water to flow from the waste tank 34 to the dirty tank 24. When the high level switch 66 of the dirty tank 24 is activated, a signal is sent to the controller to indicate that the dirty tank 24 is full of dirty water, and the controller sends a signal to close the valve 44*b*. In another example, the valve 44*b* closes after a predetermined amount of time.

The controller sends a signal to open the valve 48*b* for a predetermined amount of time to offload dirty water from the dirty tank 24 to the first filter 14 through a hose 48*c*. When the switch 70 of the first filter 14 is activated, a signal is sent to the controller to indicate that the first filter 14 is full of dirty water, and the operation is stopped and an alarm sounded. If the switch 80 of the waste tank 34 is off, nothing occurs.

When an auxiliary button (not shown) is pressed by an operator, the controller sends a signal to open the valve 44*b* to allow water to flow from the waste tank 34 to the dirty tank 24 through a hose 44*c* until the high switch 66 of the dirty tank 24 is activated to indicate that the dirty tank 24 is full of dirty water and sends this signal to the controller. In another example, the valve 44*b* is open for a predetermined amount of time. The controller sends a signal to close the valve 44*b* and then open the valve 52*b* for a predetermined amount of time to offload dirty water from the dirty tank 24 to the waste tank 34 through a hose 52*c*. This cycle continues until the waste tank 34 is no longer full, and the operator manually closes the valve 52*b*.

Rinse

Another operation is a rinse operation. When a button (not shown) is pressed, the controller sends a signal to open the valve 56*b* to allow clean water to flow from the water tank 18 to the clean tank 22 though a hose 56*c* until the high switch 74 in the clean tank 22 is activated. A signal is sent to the controller to indicate that the clean tank 22 is full of clean water. In another example, the valve 56*b* is open for a predetermined amount of time. The controller then sends a signal to close the valve 56*b*.

The controller sends a signal to open the valve 62*b* between a clean water pump 82 and the clean tank 22 and to activate the clean water pump 82. A manual valve 84 is also opened. An operator can then rinse with a hose as needed using a garden hose type sprayer with a small high pressure pump. The water tank 18 is loaded as needed to keep the water tank 18 full of clean water. The clean water pump 82 is active until a low switch 76 of the clean tank 22 is activated, sending a signal to the controller to indicate that the clean tank 22 contains a low volume of water. The operation ends when the operator closes the manual valve 84.

Wet Line 36

Dry dust and silica dust can be generated during dry grinding or sawing, and this dust builds up in the system 10. Water can be added to the dry dust and silica dust to create a slurry, preventing the dry dust from becoming airborne and collecting. The dry dust and silica dust can be removed from the system 10 and added to and processed with the slurry by adding water from a wet line 36 to the dry dust and silica dust. Water is sprayed through a wet line 36 to knock the dry dust and the silica dust into the slurry.

To use the wet line 36, the controller sends a signal to open the valve 56*b*, and clean water is loaded into the clean tank 22 from the water tank 18 through the hose 56*c* until the high switch 66 of the clean tank 22 indicates that the clean tank 22 is full, or after a fixed amount of time. A signal is sent to the controller, and the controller sends a signal to activate a clean water pump 84 and open the valve 64*b* to pump clean water through the hose 64*c* and through the open valve 64b to the wet line 36. In another example, the water is added to the wet line 36 from an external source. The clean water in the wet line 36 is used to mix with dry dust and silica dust to create a slurry and prevent these particles from becoming airborne.

An actuator is then opened. The vacuum pump 94 is activated, and the valve 46b opens to allow the dirty water from the wet line 36 to flow though the hose 46c to load the dirty tank 24 until the high switch 66 activates, indicating that the high tank is full. A signal is sent to the controller, and the controller sends a signal to close the valve 46b. In another example, the valve 46b closes after a fixed amount of time.

The controller sends a signal to open the valve 48b for a fixed amount of time to offload the dirty water in the dirty tank 24 to the first filter 14 through the hose 48c. Once a low switch 72 of the clean tank 22 is activated to indicate that the clean tank 22 contains a low amount of water, the controller sends a signal to close the valve 48b and end the operation.

Figure 4:
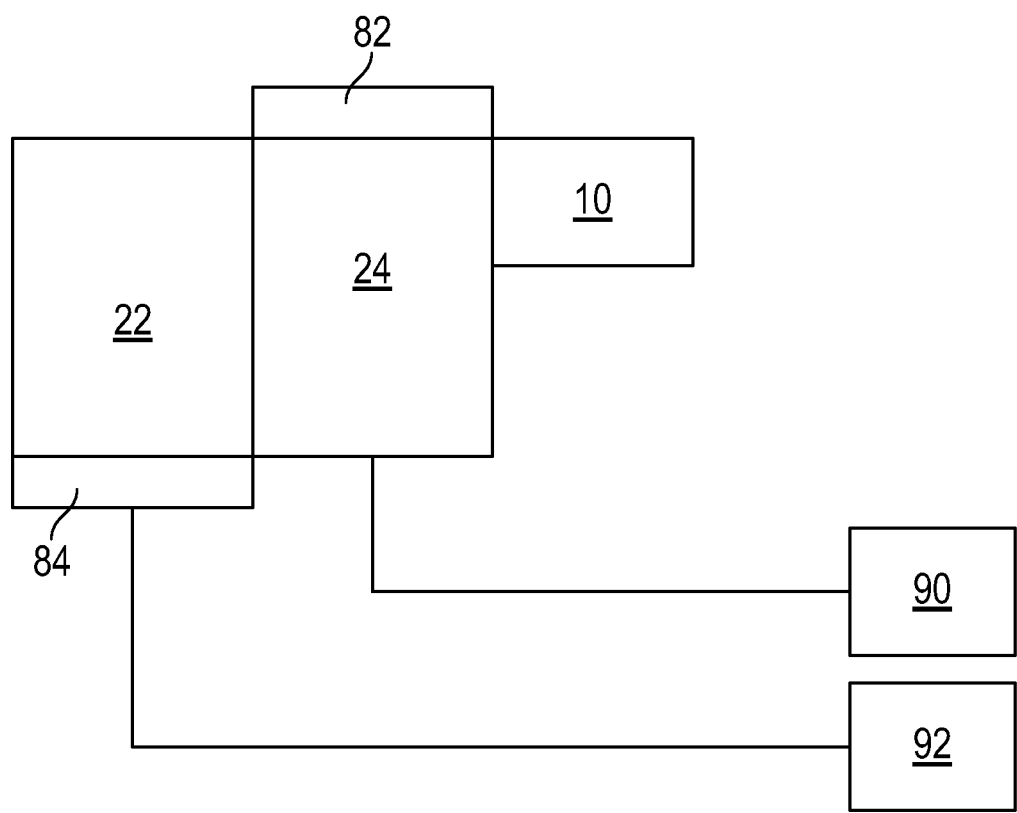
FIG. 4 illustrates a schematic view of a wet line of the water filtration and recycling system.

As shown in FIG. 4, the water pump 84 pumps water from the clean tank 22 and through a water hose 86 to mix with the dry dust and silica. The vacuum pump 94 provides suction to extract dirty water through an extraction hose 88 and into the dirty tank 24. An attachment 90 can be connected to the extraction hose 88 to extract the dirty water to the dirty tank 24 with the vacuum pump 94. In one example, the attachment 90 is a squeegee. In another example, the attachment 90 is a grinder dust shroud. The grinder will be dry grinding, and the water hose 86 will add water to the particles to turn it into slurry. The water hose 86 can also be connected to a machine 92 that refills the water tank 18 with clean water while the wet line 36 is operating. In another example, the attachment 90 and the machine 92 that refills clean water are used at the same time.

Override Operations

There are several operational overrides in the system 10. If the switch 70 of the first filter 14 is actuated to indicate that the first filter 14 is full of water, the valve 48b cannot open to prevent overflow. If the switch 78 of the second filter 16 is actuated to indicate that the second filter 16 is full of water, the valve 50b cannot open to prevent overflow. If the switch 96 of the water tank 18 is actuated to indicate that the water tank 18 is full of water, the valve 60b cannot open to prevent overflow. Finally, if the switch 80 of the waste tank 34 is actuated to indicate that the waste tank 34 is full of water, all operations are ceased to prevent a spill.

Additionally, there are several operations that can be automatically activated. The process waste water operation can be continuous and use a switch to monitor the operation.

When the switch 70 of the first filter 14 indicates that the water level in the first filter 14 high, a signal is sent to the controller, and the controller sends a signal to open the valve 40b to offload water from the first filter 14 through the hose 40c and into the dirty water tank 24. The controller sends a signal to close the valve 40b and open the valve 50b, and dirty water is offloaded to the second filter 16 through the hose 50c.

When the switch 78 of the second filter 16 indicates that the water level is high, a signal is sent to the controller, and the controller sends a signal to close the valve 50b to stop water from offloading to the second filter 16. The controller sends a signal to open the valve 54b to offload water from the second filter 16 through the hose 54c to the clean tank 22. The controller sends a signal to open the valve 60b, and the clean water from the clean tank 22 is offloaded through the hose 60c to the water tank 18.

If the switch 96 of the water tank 18 is activated to indicate a high level of water, a signal is sent to close all the valves to end the offloading of clean water.

The waste tank 34/auxiliary operation can also be continuous. If the switch 80 of the waste tank 34 indicates that the waste tank 34 is full, a signal is sent to the controller to stop all operations. The controller sends a signal to open the valve 44b, and the processed water is offload from the waste tank 34 and into the dirty tank 24 through the hose 44c. The controller sends a signal to open the valve 52b, and processed water is offloaded from the dirty tank 24 through the valve 52b. The process is continued until the switch 80 of the waste tank 34 no longer indicates that the waste tank 34 is full. When this process is complete, the process that was previously occurring resumes.

In another example, the system 10 is mobile and mounted on a small vehicle with wheels that is operated by a driver. The system 10 is used to clean dirt off of floors in a building instead of concrete slurry. Water is mixed with the dirt and suctioned into the external machine 12, and the cycle operates as described above to allow clean water to be filtered from the dirty water and recycled for additional usage.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A water filtration and recycling system comprising:
   an external machine to collect solid particles and water;
   at least one filter to filter the solid particles from the water to form filtered water;
   a water tank to store the filtered water, wherein the filtered water recycles to the external machine in a closed loop; and
   a recycling machine in fluid communication with the external machine, the at least one filter, and the water tank, the recycling machine including:
      a clean tank to hold clean water that cycles through the water filtration and recycling system;
      a dirty tank to hold dirty water that cycles through the water filtration and recycling system,
      a dirty water in manifold to direct the water into the dirty tank;
      a dirty water out manifold to direct the water out of the dirty tank;
      a clean water in manifold to direct the water into the clean tank; and
      a clean water out manifold to direct the water out of the clean tank.

2. The system as recited in claim 1, including a vacuum to generate pressure or suction and a positive negative pressure switch to direct the pressure or the suction to the clean tank or the dirty tank.

3. The system as recited in claim 1, wherein the external machine includes a suction tool to extract the solid particles and the water into an external tank of the external machine.

4. The system as recited in claim 1, wherein the external machine includes an external tank, a first valve is configured to move to an opened position to offload the water from the external tank and into the dirty tank, a second valve is configured to move an opened position when the first valve is in a closed position to offload the water from the dirty tank and into the at least one filter, and the second valve is configured to move to a closed position when a first switch in the at least one filter detects a high water level.

5. The system as recited in claim 1, wherein a first valve is configured to move to an opened position to load the clean tank with clean water from the water tank, and the first valve is configured to move to a closed position when a high switch in the clean tank detects a high water level in the clean tank, and the first valve is configured to move to the closed position when a second valve is configured to move to an opened position to offload the clean water from the clean tank and into the external machine.

6. The system as recited in claim 1, wherein a first valve is configured to move to an opened position to offload dirty water from a first filter of the at least one filter to the dirty tank until a high switch in the dirty tank detects a high level of the dirty water;
   wherein a second valve is configured to move to an opened position to offload the dirty water from the dirty tank to a second filter of the at least one filter when the first valve is in a closed position, and the second valve is configured to move to a closed position when a switch in the second filter detects a high level of water in the second filter;
   wherein a third valve is configured to move to an opened position to offload the clean water from the second filter to the clean tank in response to a signal from a high water level switch of the clean tank; and
   a fourth valve is configured to move to an opened position to offload the clean water from the clean tank to the water tank until a high switch in the clean tank detects a high level of the clean water.

7. The system as recited in claim 1, wherein a first valve is configured to move to an opened position to offload the dirty water from a first filter of the at least one filter to the dirty tank until a high switch of the dirty tank detects a high water level in the dirty tank;
   wherein the first valve is configured to move to a closed position and a second valve is configured to move to an opened position to allow the dirty water from the dirty tank to offload to a second filter of the at least one filter and the second valve is configured to move to a closed position when a switch in the second filter detects a high level of water;
   wherein a third valve is configured to move to an opened position to allow the clean water to offload from the second filter to the clean tank until a high switch in the clean tank detects a high level of water; and
   wherein the third valve is configured to move to a closed position and a fourth valve is configured to move to an opened position to offload the clean water from the clean tank to the water tank until a switch in the water tank activates a high level of water, and the fourth valve close in response to a signal from the switch in the water tank.

8. The system as recited in claim 1, including a switch configured to detects when a level of water in a waste tank is high and configured to close all valves but for a first valve that is configured to move to an opened position to offload water from the waste tank to the dirty tank and the first valve is configured to move to a closed position when a switch of the dirty tank detects a high water level in the dirty tank.

9. The system as recited in claim 1, wherein a first valve is configured to move to an opened position to allow the clean water from the water tank to offload to the clean tank until a high switch in the clean tank detects a high level of water, and the first valve is configured to move to a closed position and a second valve is configured to move to an opened position to allow a clean water pump to pump clean water from the clean tank to be used as rinse water.

10. The system as recited in claim 1, including a wet line, wherein the clean water is configured to be offloaded into the clean tank from the water tank until a high switch of the clean tank detects a high level of water in the clean tank, and a clean water pump is configured to be activated to pump clean water to the wet line to mix with dirt and flow into the dirty tank.

11. The system as recited in claim 10, wherein a vacuum pump is configured to offload dirty water from the wet line to load the dirty tank until the high switch of the dirty tank detects a high level of water, and a valve is configured to move to an opened position to offload dirty water in the dirty tank to the at least one filter until a low switch in the clean tank detects a low level of water.

12. The system of claim 1, wherein the at least one filter includes:
   a first filter to filter the solid particles from the water to form primary filtered water; and
   a second filter to filter the solid particles from the primary filtered water to form secondary filtered water;
   wherein the water tank is configured to store the secondary filtered water.

13. The system of claim 1, wherein the dirty water in manifold includes an inlet valve fluidly downstream from an eternal tank on the external machine and an outlet valve fluidly upstream of the dirty tank.

14. The system as recited in claim 13, wherein the dirty water out manifold includes an inlet valve fluidly downstream of the dirty tank and fluidly upstream of the at least one filter.

15. The system as recited in claim 13, wherein the at least one filter includes a first filter and a second filter, and the dirty water out manifold includes a first three-way valve configured to direct dirty water through the first filter and into a valve in the dirty water inlet manifold.

16. A method of filtering and recycling water comprising the steps of:
   collecting solid particles and water with an external machine;
   filtering the solid particles from the water with at least one filter to form filtered water;
   storing the filtered water in a water tank; and
   recycling the filtered water to the external machine for use in the step of collecting solid particles and water with a recycling machine in a closed loop, the recycling machine is in fluid communication with the external machine, the at least one filter, and the water tank, the recycling machine including:
   a clean tank to hold clean water that cycles through the at least one filter and the recycling machine;
   a dirty tank to hold dirty water that cycles through the at least one filter and the recycling machine;
   a dirty water in manifold to direct the water into the dirty tank;
   a dirty water out manifold to direct the water out of the dirty tank;
   a clean water in manifold to direct the water into the clean tank; and a clean water out manifold to direct the water out of the clean tank.

17. The method of claim 16, wherein the external machine includes an external tank and the recycling machine includes a first valve that is opens to offload the water from the external tank and into the dirty tank and when the first valve is closed and a second valve is opened, the water from the dirty tank is offloaded into the at least one filter, and the second valve closes when a first switch in the at least one filter detects a high water level.

18. The method as recited in claim 16, wherein the recycling machine includes a first valve that is opened to load the clean tank with clean water from the water tank, and when a high switch of the clean tank detects a high water level in the clean tank, the first valve is closed and a second valve is opened to offload the clean water from the clean tank and into the external machine.

19. The method as recited in claim 16, wherein the recycling machine includes a first valve opens to offload dirty water from a first filter of the at least one filter to the dirty tank until a high switch in the dirty tank detects a high level of the dirty water, the first valve closes and a second valve opens to offload the dirty water from the dirty tank to a second filter of the at least one filter, the second valve closes when a switch in the second filter detects a high level of water in the second filter, a third valve opens to offload the clean water from the second filter to the clean tank until a high switch of the clean tank detects a high water level in the clean tank, the third valve closes, and a fourth valve opens to offload the clean water from the clean tank to the water tank until a high switch in the clean tank detects a high level of the clean water.

20. The method as recited in claim 16, wherein the recycling machine includes a first valve opens to offload the dirty water from a first filter of the at least one filter to the dirty tank until a high switch of the dirty tank detects a high water level in the dirty tank, the first valve closes, a second valve opens to allow the dirty water from the dirty tank to offload to a second filter of the at least one filter, the second valve closes when a switch in the second filter detects a high level of water, a third valve is opened to allow the clean water to offload from the second filter to the clean tank until a high switch in the clean tank detects a high level of water, the third valve closes, a fourth valve opens to offload the clean water from the clean tank to the water tank until a switch of the water tank activates a high level of water, and the fourth valve closes.

* * * * *